(12) United States Patent
Hakala et al.

(10) Patent No.: US 10,896,814 B2
(45) Date of Patent: Jan. 19, 2021

(54) IONIZATION DEVICE

(71) Applicant: KARSA OY, Helsinki (FI)

(72) Inventors: Jani Hakala, Vantaa (FI); Jyri Mikkilä, Helsinki (FI); Verner Hemmilä, Ohkola (FI); Mikko Sipilä, Helsinki (FI); Aleksei Shcherbinin, Helsinki (FI); Hans-Jurg Jost, Vantaa (FI)

(73) Assignee: KARSA OY, Helsinki (FI)

( * ) Notice: Subject to any disclaimer, the term of this patent is extended or adjusted under 35 U.S.C. 154(b) by 148 days.

(21) Appl. No.: 16/334,630

(22) PCT Filed: Sep. 11, 2017

(86) PCT No.: PCT/FI2017/050643
§ 371 (c)(1),
(2) Date: Mar. 19, 2019

(87) PCT Pub. No.: WO2018/050962
PCT Pub. Date: Mar. 22, 2018

(65) Prior Publication Data
US 2020/0388478 A1    Dec. 10, 2020

(30) Foreign Application Priority Data

Sep. 19, 2016 (FI) ........................ 20165702
May 23, 2017 (FI) ........................ 20175460

(51) Int. Cl.
*H01J 49/14*    (2006.01)
*G01N 1/22*    (2006.01)
(Continued)

(52) U.S. Cl.
CPC .......... *H01J 49/145* (2013.01); *G01N 1/2208* (2013.01); *G01N 1/40* (2013.01);
(Continued)

(58) Field of Classification Search
CPC ...... H01J 49/145; H01J 49/26; H01J 49/0422; H01J 49/0431; G01N 1/2208; G01N 1/40; G01N 2001/024; G01N 2001/4038
See application file for complete search history.

(56) References Cited

U.S. PATENT DOCUMENTS 2,968,730 A    1/1961  Morris et al.
4,266,127 A    5/1981  Chang
(Continued)

FOREIGN PATENT DOCUMENTS

EP    2363877 A1    9/2011
JP    2005-353340 A    12/2005

OTHER PUBLICATIONS

International Search Report and Written Opinion, dated Feb. 14, 2018, from corresponding PCT application No. PCT/FI2017/050643.
(Continued)

*Primary Examiner* — Nicole M Ippolito
*Assistant Examiner* — Hanway Chang
(74) *Attorney, Agent, or Firm* — Nixon & Vanderhye

(57) ABSTRACT

Disclosed are a multimethod ionization device (MID) to utilize at least chemical ionization and a system further utilizing such a device provided with a reaction chamber for ion formation of reagent species for adduct formation from at least one analyte to be characterized as based on mass to charge ratio for the analyte identification.

20 Claims, 5 Drawing Sheets

Figure 1:
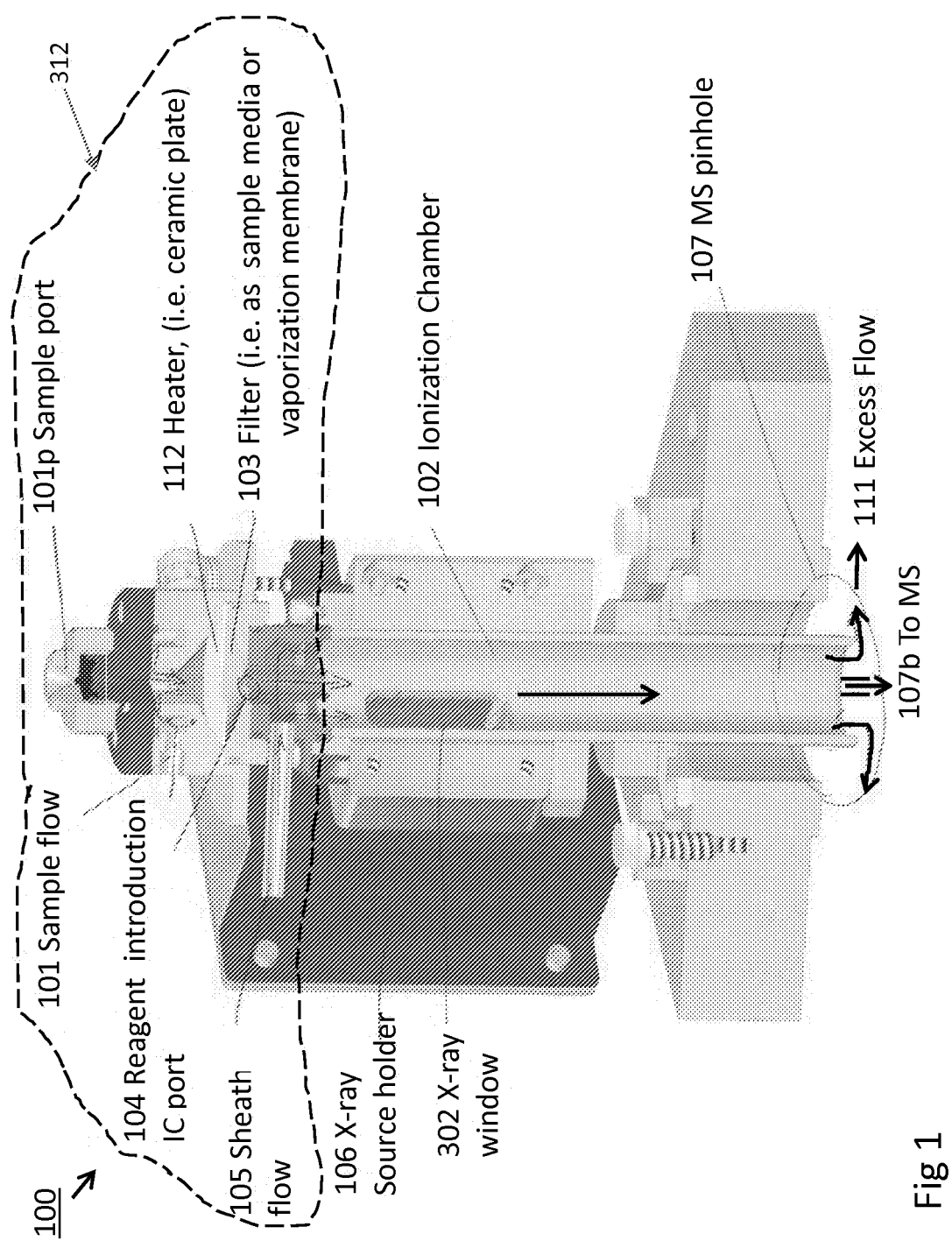

(51) Int. Cl.
  *G01N 1/40*   (2006.01)
  *H01J 49/26*  (2006.01)
  *H01J 49/04*  (2006.01)
  *G01N 1/02*   (2006.01)

(52) U.S. Cl.
  CPC ........ *H01J 49/26* (2013.01); *G01N 2001/024* (2013.01); *G01N 2001/4038* (2013.01); *H01J 49/0422* (2013.01); *H01J 49/0431* (2013.01)

(56) References Cited

U.S. PATENT DOCUMENTS

| | | |
|---|---|---|
| 5,175,431 A | 12/1992 | Eisele et al. |
| 6,459,079 B1 | 10/2002 | Machlinski et al. |
| 2002/0124664 A1 | 9/2002 | Call et al. |
| 2006/0049346 A1 | 3/2006 | McGann et al. |
| 2008/0206106 A1 | 8/2008 | Fernandez De La Mora |
| 2009/0294649 A1 | 12/2009 | Shabanowitz et al. |
| 2010/0096542 A1 | 4/2010 | Whitehouse et al. |
| 2013/0260478 A1 | 10/2013 | Ewing et al. |
| 2015/0233796 A1 | 8/2015 | Kashima et al. |
| 2015/0235829 A1 | 8/2015 | Chung et al. |
| 2016/0005578 A1 | 1/2016 | Koeppen et al. |
| 2016/0126079 A1 | 5/2016 | Sipilä et al. |

OTHER PUBLICATIONS

Supplementary Partial European Search Report issued in European Patent Application No. 17 85 0350 dated Apr. 7, 2020.

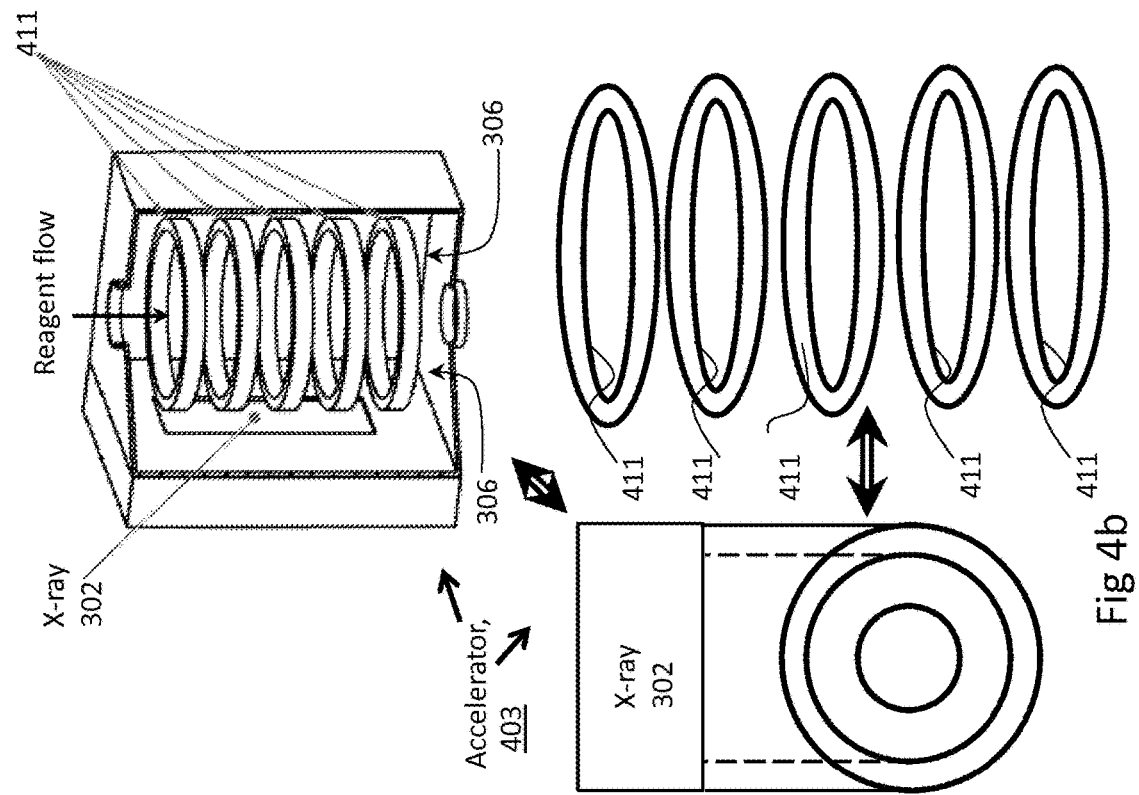
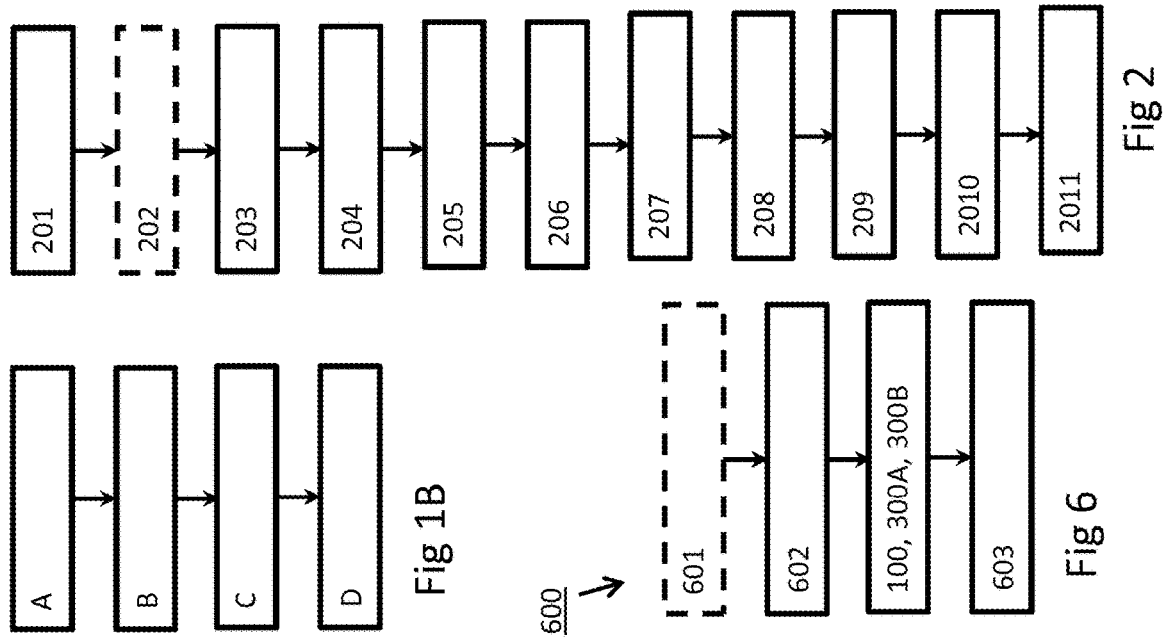

IONIZATION DEVICE

TECHNICAL FIELD

Generally, embodiments of the invention relate to improvements in techniques of ionization devices. Embodiments of the invention relate more specifically to a device that has ability to utilize chemical ionization in the operation in addition to other ionization mechanisms. The embodiments of the invention relate more specifically to a multimethod ionization device as recited in the preamble part of an independent claim directed to the multimethod ionization device, capable of utilizing chemical ionization. Embodiments of the invention relate also to a method of defining identification of chemical constituents of a sample by using such a ionization device capable of utilizing chemical ionization achieved in an embodied manner. Even more specifically, embodiments of the invention relate to identification and detection of substances down to trace level concentrations.

BACKGROUND TECHNOLOGY

In atmospheric research, sampling and the sample handling as well as the preparation of the sample for the final analysis of the substances are primary functions needed in such studies directed to the atmospheric composition in a detail. However, the substances down to the trace-level concentrations are difficult to detect reliably in a reasonable time to be consumed for the sampling. Identification of the trace-level amounts of the substances can be challenging even for mass spectrometers. As a consequence to facilitate lower level substances getting identified, the detection limit of the devices as such has been tried to get lower. Another way to increase the reliability has been increasing the detection time of a sample, if the sample is not sufficiently richly present. In field of pure research, the number of samples to be analyzed is often small, and thus the delay due to the increased sampling time is acceptable or at least tolerable in the atmospheric studies, aimed to collect the sample sufficiently rich to distinguish the interesting species from the plurality of ordinary compounds that are present in rich in the natural samples.

Operations of mass spectrometers and ion mobility analyzers are based on particles or molecules to carry a charge in a sample. Consequently the sample containing the desired molecules needs to be charged or ionized, at least in part, in such an extent that the analysis is facilitated by the applicable analyzer.

However, for the analytical purposes, the medium as well as potential reagent raw materials should be well-defined and pure, for example to avoid mixtures of various irrelevant radicals to being formed in the ionization processes involved. In the radiation for example, to interfere the mass/charge ratio based measurements of atmospheric substances in the sample, so that the noise of the non-wanted impuritysubstances would be minimized.

It is important that the sampled molecules preserve as much as possible intact, for the recognition, and so keeping in the recognition phase the cluster analysis as simple as reasonably possible, for avoidance of wasting time, or keeping the time consumed to the analysis in somewhat tolerable level.

In known state of the art, it is also important to protect the sampled analyte as such up to the reaction chamber in which the reagent radicals, or the ions formed from them, make adducts with the sample molecules.

In order to improve the number of charged molecules in the sample part that is about to enter the mass spectrometer, Chemical Ionization (CI) has been also introduced for selective ionization, to be used in the sample preparation before mass spectrometry.

The ionization of the reagent in CI utilizing processes is traditionally made by using radiation and/or radioactivity for making ions into the reagent flow, for carrying charges, to be introduced to a reaction chamber, and to selectively adduct with the desired substances that are expected to occur in the sample.

Chemical ionization has been used as such as a mechanism for getting made ions to join to desired molecules to form adducts of them, to be utilized as such in the analysis of the molecules of the substances in a mass spectrometer. Analysis as such is made according to the state of the art as based on mass to charge ratio of the molecules of the sampled media, prepared and led into the mass spectrometer, or another device attuned for detection of ions and charged molecular clusters, that is suitable to the analysis.

Chemical ionization (CI) is arranged to occur in a chemical ionization inlet unit as such as in general. CI is based on the analyte molecule reaction with the separately produced ionizing ion to form an adduct carrying a charge. The charged adduct is guided, in an analyte carrying flow, with or without electric fields to a mass spectrometer arranged to measure the mass/charge ratio and consequently to recognize the molecules as based on the ratio. As reagent substances, nitric acid is used in forms of nitrate ions $NO_3^-$ for CI.

The ions are formed from $HNO_3$ by radiation as described as such, and the nitrate ions are introduced to the sample flow to get mixed, and the adducts to get formed. The sample is at least partly led to the mass spectrometer, where the mass/charge ratio is detected, and the substance recognized by the computer program and a database.

However, the applicants have noticed, that the atmospheric research used devices could be used but with suitable modifications also in other fields, such as trace level substance recognition, as illicit substance recognition from cargo, from passengers or from their luggage. However, for example such illicit substances as drugs, narcotics, explosives or nerve gases (to mention few as examples without any intention to limit the list only to the mentioned hazardous or harmful and/or highly valued substances) that are hazardous but may be at least tried to get transported in public traffic, including airways, to be used for forbidden or hazardous purposes, are very difficult to detect because of their low level concentration on the luggage for example.

SUMMARY OF THE INVENTION

It is an object of the present invention to implement such a solution that previously mentioned drawbacks of the state of the art could be avoided or at least diminished. In particular, the invention is implied to solve how to increase selectively the contrast of an analyte species concentration visibility for various analytes from samples that are directed to a final analysis in the identification of the species in the spectrum of mass/charge ratio. A further corollary aspect brings along such a surprising technical effect that it is hence possible to involve several ionization schemes simultaneously and rapidly switch between them, especially without switching the device individual to another unit. A further corollary unexpected effect relates to the detection time of a certain mass of the sample being shortened because of the potential analyte adducts formation effectively being increased so shortening the time of material collection to the ion detection and the mass analysis. The objectives of the invention are met by the features disclosed in the independent patent claims directed to multimethod ionization device (MID).

A Multimethod Ionization Device, MID, (also cited via abbreviation MID, as in MID-device or MID-unit in the following) according to the present invention is characterized by the features in the characterizing part of an independent claim directed thereto.

According to an embodied MID-device, the device is able to utilize multimethod ionization in controlled manner, according to an embodiment, by utilizing several reagent ion species under control and/or the ion species selection to be utilized.

A MID-device according to an embodiment of the invention comprises a port structure further comprising at least one of the following ports: a reagent introduction port, sample introduction port, sheath flow introduction port, a flow laminarization assembly arranged to be located at the sample entry part of the chamber to make at least one of the sheath flow and sample flow laminar in the chamber, wherein the MID-device further comprises a ionization source to ionize sample analytes and reagent species in the chamber part of the chamber, wherein the sample flow channel extending to the chamber is arranged to guide the sample analytes in the core flow in the chamber core part together with the reagent species, the core flow being surrounded by the sheath flow, the core flow carrying the sample analytes and a reagent species to pass by the ionization source that is arranged to ionize the sample constituents analytes simultaneously together with the reagent species.

A Dual MID-device according to an embodiment of the comprises at least two chambers, a first chamber and a second chamber, said chambers each being dedicated to a respective reagent species, respectively, to have the sample being expose with, as being divided by a divider into said chambers, as to a first sample part and a second sample part, each with sample part specific sample analytes present for getting mixed into chamber specific flows in the chamber specific entry part of the port structure with said reagents, respectively, to expose each chamber specific sample-analyte reagent mixtures to ionization simultaneously, the reagent and sample analyte part together carrying the sample analyte and a reagent species in the flow in respective chambers to pass by the ionization source that is arranged to ionize the sample analyte simultaneously together with the reagent species in each chamber.

According to an embodiment variant, the ionization is continuous at least during the sample flow. According to a variant of the embodiment the ionization simultaneousness can be adjusted by the electric field in the chamber.

According to an embodiment, each chamber of the Dual MID-device comprises a chamber specific sheath potential source, arranged to the respective chamber to set the chamber wall to the respective chamber specific sheath potential.

According to an embodiment, each chamber of the Dual MID-device comprises an ion source that comprises an X-ray source, advantageously separated from the chambers by a window allowing the X-rays to penetrate into the chamber at the window location in the chamber.

According to an embodiment, each chamber of the Dual MID-device comprises a chamber part, as a reaction chamber, after the ionization part end to provide reaction time to formation of adducts from the chamber specific reagent species and the sample part analytes pre-sent in the chamber to form reagent specific adducts in each reagent specific respective chamber.

According to an embodiment, each chamber of the Dual MID-device comprises a port structure further comprising at least one of the following ports: a reagent introduction port, sample introduction port, sheath flow introduction port, a flow laminarization assembly arranged to be located at the sample entry part of the chambers to make the sample flow laminar in the chambers at each chamber entry.

According to an embodiment, each chamber of the Dual MID-device comprises a passage between at least two chambers, for providing a passage to reagent specific adducts to exit of the Dual MID-device from a chamber of the dual MID-device.

According to an embodiment, each chamber of the Dual MID-device comprises an ion guide assembly to guide the adducts out of the Dual MID-device by at least one of the following: by electric field, by a kicker electrode, by flow means to provide a flow to flush, or for a counter flow, and a connection to the ion analyzer.

An optional MID-device being optionally implemented to the embodied MID-device and/or to the embodied Dual Mid-device wherein the optional MID-device comprises a plurality of reagent flow introduction ports for each reagent, said introduction ports followed by an accelerator provided with a ionization source arranged to ionize each reagent species into ions to be accelerated by electro-magnetic fields before the reagent ion species entry to the reaction chamber, wherein the analytes in the sample introduction flow to carry sample analytes to the reaction chamber is/are arranged to mix with a at least one of the reagent ion species, at the respective accelerator outlet location to form adducts into the chamber volume, of the analyte species and the reagent ion species present in the chamber. According to an embodiment, the electromagnetic fields comprise an electrostatic static field. According to a further variant of embodiment, the electrostatic field comprises in supplement or in alternative an electro dynamic field.

Optional MID-device is also a MID-device according to an embodiment.

According to an embodiment the optional MID-device comprises such an accelerator that comprises flow means arranged to flush the accelerator exit, and/or to adjust the ion species introduction to the chamber part.

According to an embodiment the optional MID-device comprises an additional ion source in the chamber at least at one accelerator location for further ionization of the substances comprising present sample analytes, at the ion source location.

According to an embodiment the optional MID-device comprises an exit of the MID-device from a chamber, for the formed adducts, to an ion detection device.

According to an embodiment the optional MID-device comprises an ion guide assembly to guide the adducts out of the MID-device by at least one of the following: by electric field, by a kicker electrode, by flow means to provide a flow to flush or a counter flow, a connection to the ion detection device.

According to an embodiment the optional MID-device comprises such a ionization source that comprises an X-ray source of soft X-rays, the energy of the X-rays being below 9 keV, advantageously below 7 keV, more advantageously be-low 6 keV, and simultaneously, preferably over 1 keV, but more preferably over 3 keV, or, the energy being selected from such a range that is comprising a below definition for the energy from the said below values and an over definition for the energy from the said over values.

According to an embodiment the optional MID-device comprises such a chamber that comprises at least two of the following: a mixing chamber part, an ionization chamber part, a reaction chamber part, in a same chamber, the other said parts being in operative communication, but separated.

According to an embodiment the optional MID-device comprises at the beginning end of the mixing chamber part, or connected thereto, a desorption unit for evaporating analyte from a collected sample.

A system according to an embodiment of the invention, to identify an analyte species from a sample, comprises as system elements an ion detection device and at least one embodied MID-device or an optional MID-device.

According to an embodiment the ion detection device comprises a mass spectrometer, advantageously such as an API-TOF-mass spectrometer (Atmospheric Pressure Ionization-Time Of Flight-mass spectrometer), or in an embodiment variant, a suitable variant of a mass spectrometer.

The system according to an embodiment further comprises as system elements a pre-concentration unit and/or a detachment unit before an embodied MID-device, for concentrating the sample for the analysis.

The system according to an embodiment further comprises as a system element such a pre-concentration unit that comprises a concentrator that is selectable from the following: an acoustic concentrator, aerodynamic lens, cyclone, or combination of the just mentioned.

The system according to an embodiment further comprises as a system element such a pre-concentration unit that comprises a virtual impactor unit further comprising at least one virtual impactor stage adapted to a high volume sampling with a high volume sampling flow.

According to an embodiment, the number of the virtual impactor (V.I.) stages is not limited only to the mentioned examples, but the virtual impactor can have several V.I. stages depending on specific application variant as such.

The system according to an embodiment further comprises in the virtual impactor unit a second virtual impactor stage adapted to suppress the high volume sampling flow to the embodied system element MID-device, and/or a desorption stage to vaporize an analyte for the entry to an embodied MID-device.

A method of analyzing analyte species in a sample according to an embodiment comprises:
bringing the sample to an embodied MID-device,
inputting at least one reagent species to a reagent inlet, for reagent species introduction,
inputting at least one sample to a sample introduction port, for such sample introduction comprising an analyte to be identified,
mixing in a chamber, comprising at least a mixing chamber part as a first chamber part, for mixing the analyte of the introduced sample with at least one introduced reagent species, said reagent species being in neutral form or in ionized form,
ionizing by a ionization source at least one reagent species,
producing reagent originating species ions by a ionization source for ion production in a ionization process, in said ionization chamber part,
exposing an analyte to bipolar ionization products to form adducts in a chamber, in the a reaction chamber part to facilitate adduct formation of said analyte and said at least one reagent species originating bipolar ionization product species to form adducts according to their ion species with the analyte molecules,
producing adducts, in the MID-device,
guiding the so formed adducts by at least one of the following: electric field and sheath flow to an the exit of the embodied MID-device as an inlet for an ion detection device,
classifying the adducts in the an ion detection analysis device as based on the mass to charge ratio for the mass analysis,
analyzing the adducts in the analysis ion detection device as based on the mass to charge ratio.

According to an embodiment the analysis result is stored to a database, and/or used in alarming/announcing when a substance under an interest was found at a concentration threshold level presence.

According to an embodiment soft X-rays are used in the ionization of the sample analytes and/or reagent species, in the embodiments, in the embodiment variant specific ways. The ion formation is thus advantageously performed in a bipolar process. However, in reagent ion species formation, also other ion sources could be utilized in the ionization in suitable part, including corona discharge, UV, radioactive sources, according to respective embodiment variants, individually or in combination.

According to an embodiment the charging can be bipolar, but in an optional embodiment the charging can comprise unipolar charging, and according to a further variant unipolar charging that is switchable between positive and negative charging mechanisms, i.e. for example by switching a corona charger in use, the polarity of the corona discharge electrodes, for the ion production in the charging process.

According to an embodiment, one optional way to produce ions is to have PPI, photoionization. The MID-device also facilitate the operation in such an optional mode where there is no device internal ionization in use (when detecting ambient ions) where no reagent ions are introduced to the same MID device.

The simultaneous presence of different ionization mechanisms in the MID-device's reaction chamber, utilizing chemical ionization, facilitates identification of species that are not necessarily of atmospheric origin, and/or are beforehand known to be in the interest, but are artificial in the samples, such as explosives, narcotics, drugs, super poisons and/or nerve gases, to mention few examples about substances that are in the interest of search as based on the molecule properties, without any intention to limit the scope only to the mentioned examples.

However, one should notice that embodiments also facilitate study of atmospheric species, without limitation only to such, but also to introduce other ionization mechanisms without foreseeable disadvantages. A further advantage of MID-devices in the embodied solutions is that by switching ion sources (supply of reagent ions selectively) it is possible to detect also ambient and naturally occurring ions and ion clusters, in a versatile way.

In embodiments of the MID-device, separate several ionization schemes can be used and use them in conjunction of one or more at a time.

A MID-device according to the invention is a device to utilize chemical ionization in addition to several other ionization mechanisms as such as being known.

According to an embodiment of the invention an embodied Multi-method Ionization Device (MID) comprises:
at least one reagent species inlet, for reagent species introduction, at least one sample introduction port, for such sample comprising an analyte to be identified, in a chamber of the unit, comprising at least a mixing chamber part as a first chamber part, for mixing the analyte of the injected sample with at least one introduced reagent species, in a chamber of the unit, comprising an ionization chamber part, for ionizing by a ionization unit at least one reagent species in a charging obtained, as a second chamber part, to ionize the introduced at least one reagent species into the device, a ionization source for ion production in the ionization process bipolar ionization products in said ionization chamber part, in a chamber of the MID-device, a reaction chamber part to facilitate adduct formation of said analyte and said at least one reagent species, by the ionization products to form adducts according to the ion species with analyte molecules, the unit further comprising at least an electrode pair for maintenance of at least one electric field therebetween said electrodes of said at least one electrode pair, the so formed adducts being guided to an outlet, of the MID-device from said chamber part, as a connection to an inlet for an analysis device.

According to an embodiment the sample introduction can be made by sample injection, according to an embodiment in liquid or gaseous form.

According to an embodiment of the invention the chamber of the MID-device can be embodied as one chamber, with functional parts for ionization, mixing and reactions for adduct formations. However, according to an embodiment such a chamber can have also a similar parallel chamber according to an embodiment of the invention. According to an embodiment the parallel chamber is one of an ensemble of parallel chambers to a chamber of the MID-device, in a multi-chamber MID-device.

According to an embodiment the guiding of the adducts out of the chamber can be made by at least one electric field according to the charge of said adduct, and/or by a sheath flow protected flow.

According to an embodiment of the invention in an embodied MID-device, the inlet for an analysis device is adapted to a mass spectrometer for analysis based on the mass to charge ratio. According to an embodiment the connection can be flushed with a sheath air flow. According to a further variant the sheath air flow is embodied to minimize sample-wall interaction. In respective embodiment variants it is also controlling reaction time, cooling down the sample if it is pre-heated (e.g. in case of filter desorption) and directing sample relatively to the mass spectrometer pinhole.

According to an embodiment of the invention in an embodied universal unit to utilize chemical ionization, the MID-device further comprises a laminar flow means arranged to produce a laminar flow as a sheath flow to protect the core of the reaction chamber from the sample constituent entry to the reaction chamber walls.

According to an embodiment of the invention in an embodied MID-device, it further comprises a laminar flow means, a flow laminarizer, arranged to pro-duce a laminar flow to the core of the reaction chamber forming the mixing volume of the analyte and the at least one reagent species.

According to an embodiment variant a parallel chamber comprising Dual MID-device can be implemented also without a sheath air flow as such in both or in either chamber.

According to an embodiment of the invention in an embodied MID-device, it further comprises an ion source for bipolar ion production into at least one ionization part of a chamber.

According to an embodiment of the invention in an embodied MID-device, the ion source comprises at least one of the following: a radiation source, an X-ray source, Corona discharge unit, a UV-source and a radioactive source.

According to an embodiment the MID-device, it further comprises an ion source for bipolar ion production into at least one ionization part of a parallel chamber and/or a parallel reaction chamber. According to an embodiment of the invention the ion source in the chamber is similar as in the parallel chamber of the embodied Dual MID-device.

According to an embodiment the adducts are analyzed in a cluster analysis of the adduct species, not necessarily limiting the scope of the data analysis algorithm only to the mentioned as an example, to obtain the mass spectra.

According to an embodiment, in addition to the adducts, there are also analyzed product ions, fragments or any ionized particles present the sample, in the mass analysis.

According to an embodiment variant, the reagent species can be mixed in neutral form with the analyte and then ionized together, or in an embodiment variant the analyte is exposed to ionized reagent species ionized before the mixing with the analyte. According to an embodiment the mixture can be further exposed to ionization.

According to an embodiment reagent ions are produced separately from the analyte, according to a further embodiment variant the reagent species separate from each other. According to an embodiment switching all of the ion sources of the device off, the ambient ion detection at the same time is possible. According to an embodiment the MID-device is embodied to comprise a combination of, if not all ionization schemes, a plurality of all of the ionization schemes in one with possibility of rapidly switching between them.

It is noticed by the applicants that those solutions that use pre-ionization of the reagent species can loose a significant portion of the ions to the molecules of not in interest, non-searched molecules, and consequently not to desired analyte molecules present in the sample, leading to charging levels that increase the detection limit, in the sense of contrast to the noise, of a smallest concentration in an arbitrary sample. Especially if there were several analytes in the interest for their identification from same sample, such losses might turn critical. Especially in aviation security, any explosives for example, must not get pass the analysis into an airplane for example, but must be identified if present and found, even if there were several types of illicit substances present as analytes in the same sample.

As the number of the illicit species is quite limited, in their detection, different ion species can be used more freely than in atmospheric applications where the problem is to find out the substances as such, without any disturbances, which makes the mass analysis algorithm operation, such as a cluster analysis algorithm complex, if there were a plurality of reagents present in the mobility analysis. Thus, in the aviation safety or narcotic smuggling detection applications the cluster analysis is simpler than in atmospheric application of the mass spectrometer, so the reagent species can be diversified, consequently increasing the analyte species number detection by one sample, but also to identification confident is also increased, as well as the smallest amount of identifiable matter is getting lower. However, although the atmospheric research used devices may be slow and tedious in aviation safety applications as such, if not completely beyond practical implementation, embodiments of the MID-device can do also all the things including beneficial for atmospheric research and basic science in general.

In embodiments of the invention, several charging mechanisms are utilized to raise the adduction of reagent substance originating ions to the analytes present in the sample, even several ionization chemistries with different reagent species that are simultaneously irradiated, with the analyte in the sample in an embodiment variant, but in another embodiment variant without the presence of the analyte in the reagent species ionization, by the radiation, for example.

Some preferable embodiments of the invention are described in the dependent claims.

Significant advantages can be achieved with the present invention when compared to the prior art solutions. The utilization is not limited by the substances as such. Especially such ELVOCs (Extremely Low-Volatility Organic Compounds) that belong to illicit substances, such as for example some explosives can be detected in an ultra-trace levels (i.e. 10E-15). The applicants have built apparatus configurations that are addressed to universal use in detection of substances in different forms and for different measurement purposes including the detection of explosives, CWA's and narcotics included but not limited to. Thus, the analyte can be introduced and measured in form of gas, liquid or particulate matter.

Embodiments of the MID-device are found also suitable for basic research in various applications or to study naturally occurring species, although the ordinary research devices in such were not practical into the aviation application of the trace substance detection in the required time scales.

According to an embodiment, it is possible also to make tandem MID-devices by operating two embodied MID-devices and/or Dual MID-devices into parallel operation, to be utilized for co-incident detection of ions in suitable applications.

According to an embodiment the MID-device can be used as a system element of such a system that is addressed to detected artificial species such as various analytes belonging to the illicit substances.

SHORT DESCRIPTION OF THE DRAWINGS

Figure 1A:
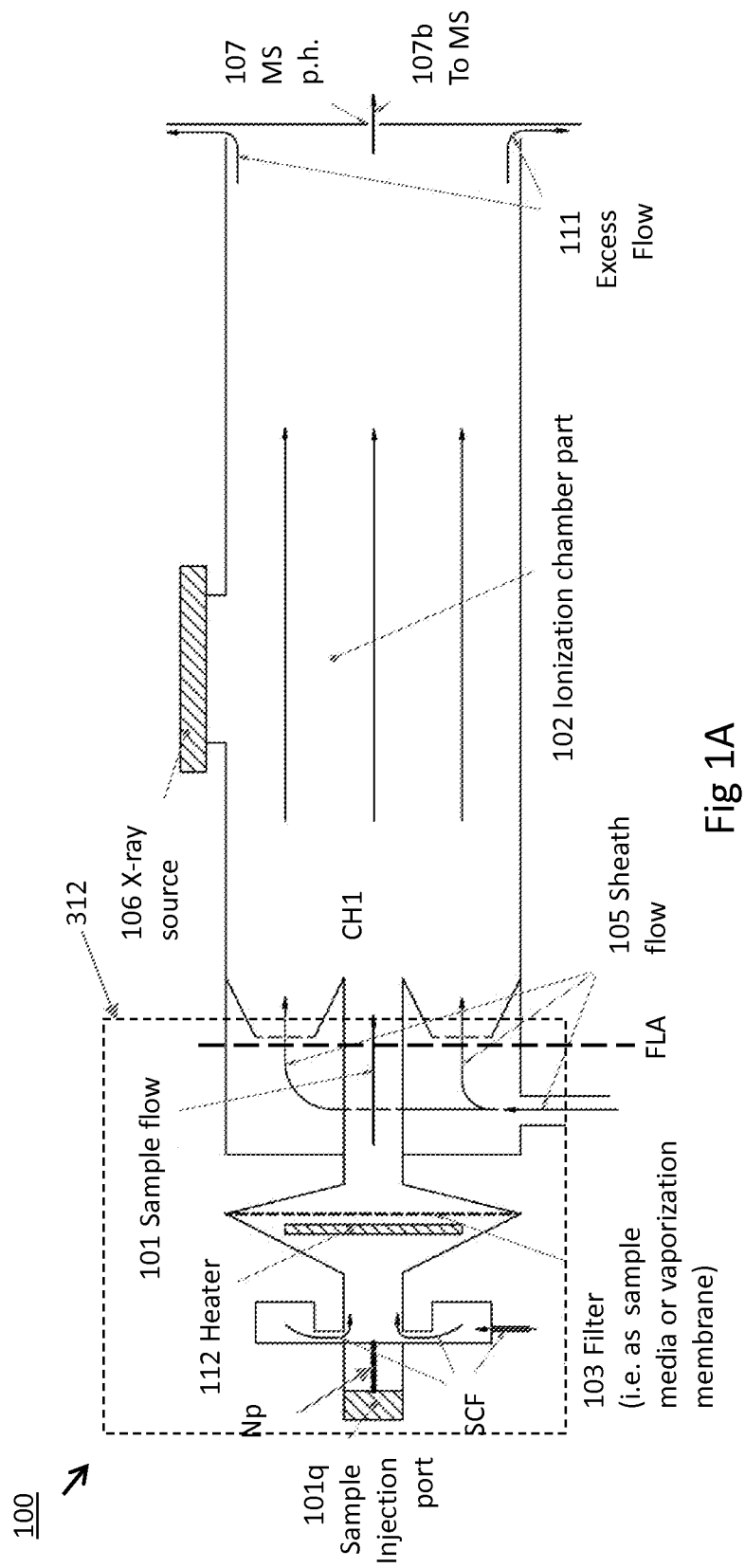
Figure 3:
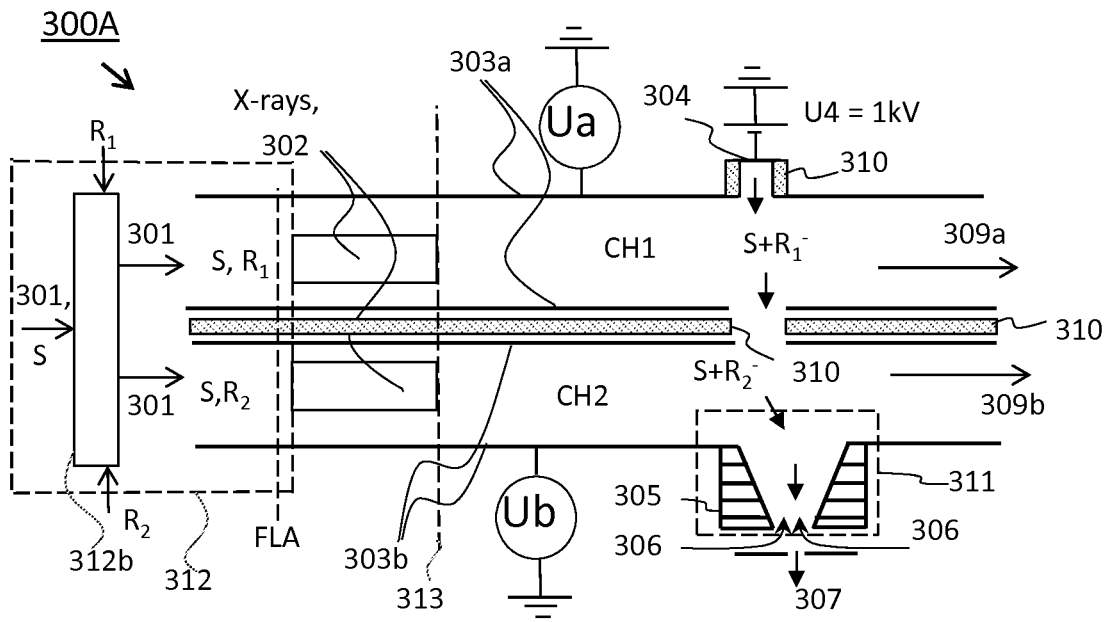
Figure 4:
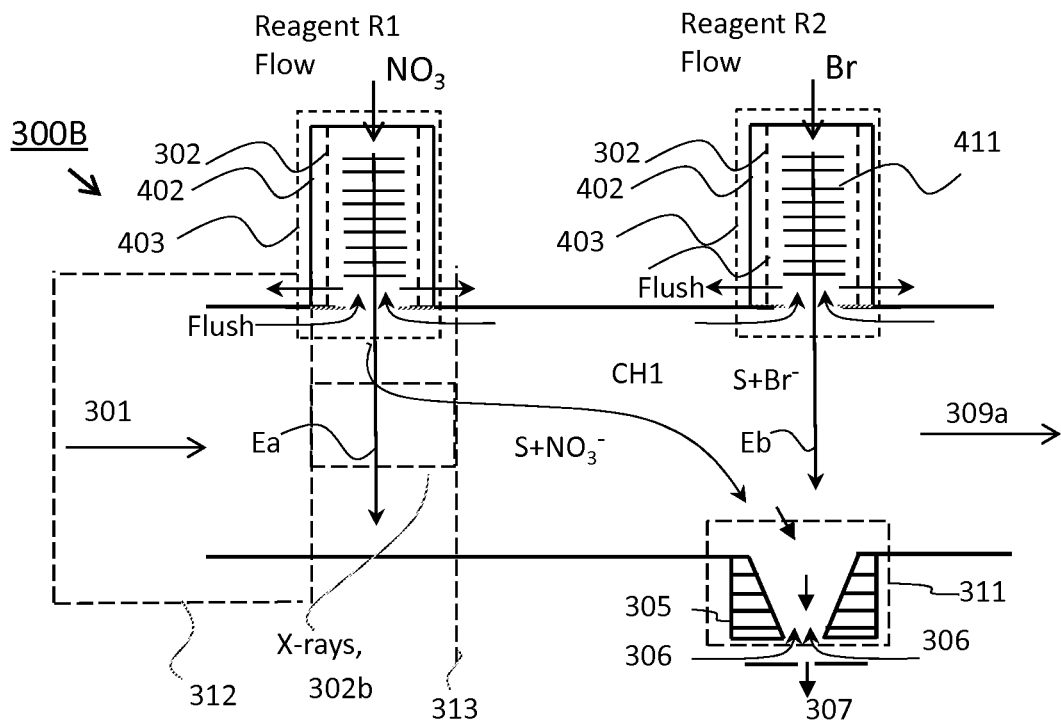
Figure 5:
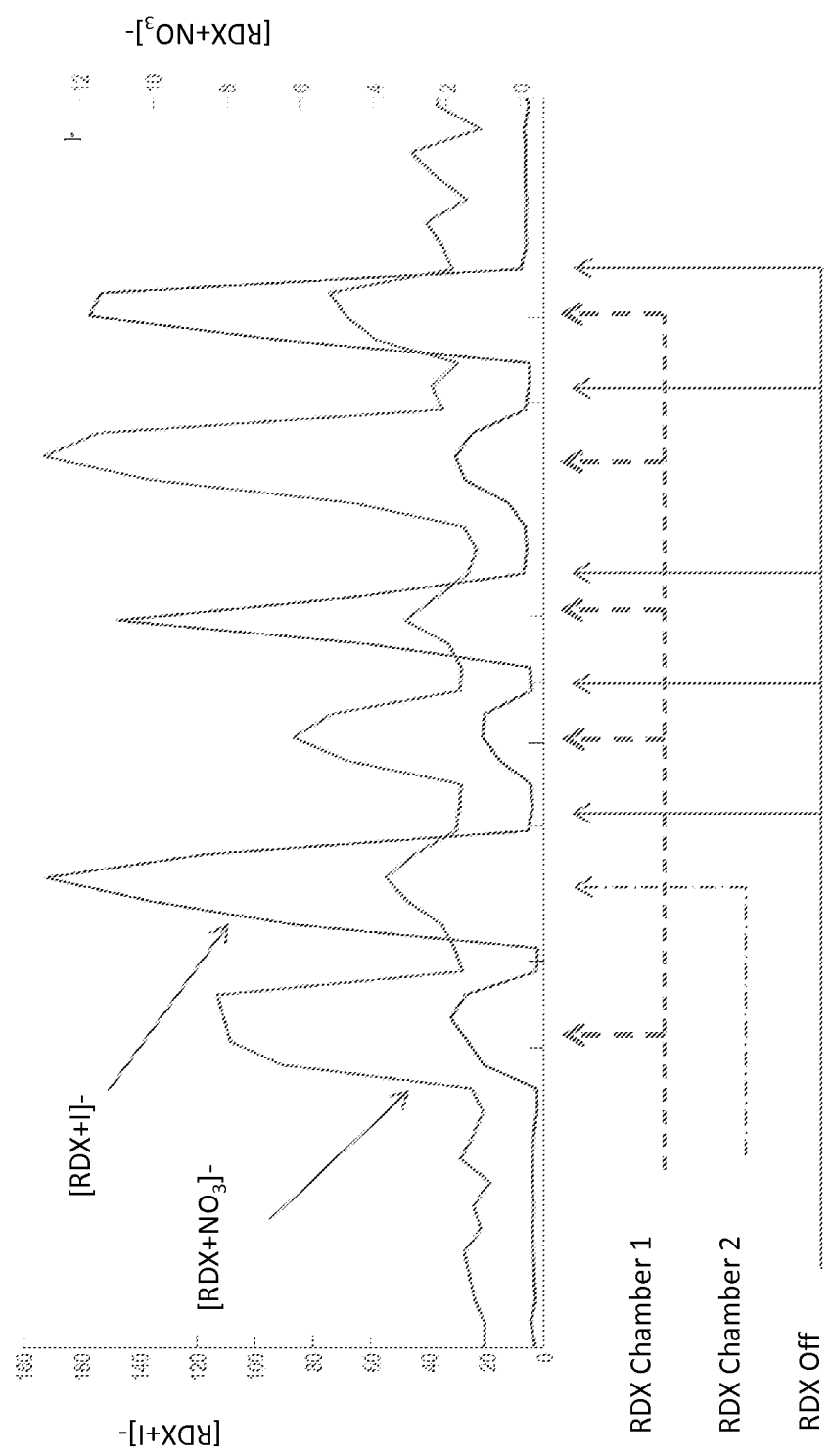

Next, the invention is described in more detail with reference to the appended drawings, in which FIG. 1 illustrates an example of an embodiment directed to a MID-device, FIG. 1A illustrates a further schematically an example of an embodiment directed to a MID-device, FIG. 1B illustrates use/operation of a detail in an example of an embodiment directed to a MID-device, FIG. 2 illustrates an example of an embodied method according to an embodiment of the invention, FIG. 3 illustrates an example of an optional embodiment on implementation of a MID-device as a dual ionization chamber, FIG. 4 illustrates an example of a further optional embodiment on an optional implementation of MID-device as a dual ionization source chamber, FIG. 4B illustrates a detail of an embodiment in accordance of FIG. 4, relating to an example of an embodiment on an optional implementation of MID-device as a dual ionization source chamber, FIG. 5 illustrates identification results of RDX by using an adduct signals by using an embodied MID-device, and FIG. 6 is illustrating a system according to an embodiment of the invention.

Same reference numerals are used to denote to the similar kind of parts or objects that do not necessarily need to be identical, if specifically otherwise not indicated, as a skilled persons know from the embodiments and the context. Also the dimensions of the objects or the ratios of such in the Figs are not restricted only to the shown examples. Embodiments of the invention are combinable in suitable part. Ionization sources and a related window to the function are also cited by the same reference symbol.

DETAILED DESCRIPTION OF EXAMPLES OF EMBODIMENTS

In FIG. 1, an embodied example on Multimethod Ionization Device, (MID, also as MID-device or MID-unit), a MID-unit, is disclosed as consisting of following blocks and functions as follows:

According to an embodiment, sample port 101*p* is a front-end device primary function of which is an introduction of the analyte to the system. According to an embodiment such sample port could consist of and work as indicated in the following configurations. The reference number 312 is citing in FIG. 1A to the introduction of an embodied MID-device, not only to the embodiments in FIG. 1A, but also in other Figs too in suitable part.

FIG. 1A illustrates an example on variant of an embodied MID-unit. The reference numerals follow the notation in FIG. 1 in suitable part. However, sample injection port 101*q* has been illustrated for injecting samples that can be introduced to the device via the needle pathway Np, into the device, in suitable part, to the sample carrier flow SCF, also the port cited with the abbreviation. According to an embodiment the reagent species in suitable part can be introduced via the sample carrier flow and its entry. Heater 112 can be used to vaporize or desorb substances from the sample. Item 103 refers to a filter, but the membrane can be also another type of a substrate to receive sample or a media carrying the sample (i.e. sample media or vaporization membrane). The item 107*b* is indicative a path to an ion analyzing device, that is exemplified in the FIG. 1A as a mass spectrometer, MS.

The FIG. 1A also illustrates Flow Laminarization Assembly FLA being arranged to laminarize at least one of the sample carrying flow and the sheath flow. In the laminar flow conditions in the chamber CH1 the sheath flow is arranged to protect the sample carrying flow in the core parts of the chamber from drifting to the walls, but also protects in the sample carrying flow carried analyte(s) and reagent species from potential but improbable impurities pre-existing in the chamber. Thus, the ionization source 106 as exemplified in the FIG. 1A as an X-ray source (but not limiting only to the mentioned example) can be matched to produce ions and so to ionize the analyte and the reagent species together, simultaneously via chemical ionization and other present ionization mechanisms.

Use of sample port 312 is illustrated in FIG. 1B, by denoting to the operations in the sample preparation for the CII as embodied also as DIC as later explained in the context of FIGS. 3 and 4. in the following optional cases 1.1, 1.2 1.3 and 1.4. by the letters A, B, C and D, as follows. The arrows show medium flow directions, in FIGS. 1, 3 and 4.

1.1 Analyte in a liquid form: According to an embodiment, the analyte is introduced to the system in the form of liquid or gas by means of introduction. A) The liquid (or gas, headspace) sample is introduced to the sample port through introduction orifice, IO at FIG. 1, directed by sample flow (8 at FIG. 1), and then according to an embodiment for the liquid B) (in case of liquid) it impacts to a porous membrane (e.g. PTFE filter—103 at FIG. 1). C) (in case of liquid) the sample is then thermally desorbed from the filter with the use of the heater (112 at FIG. 1) and is D) introduced as a gas to the Chemical Ionization Inlet carried by sample flow;

1.2 Analyte on media: According to an embodiment, the analyte is introduced on the media (e.g. filter or swab). A) The target substance is deposited on piece of porous material (e.g. PTFE filter, e.g. 103) by means of drawing sample air through it to deposit vapors and particles present in it, or swabbing the surface of interest to lift particles present on it, or soaking it in liquid for analysis of its contents. B) The filter then is placed inside the filter holder (as in 103 FIG. 1) and C) the sample is then thermally desorbed from the filter with the use of the heater (112 at FIG. 1) and is D) introduced as a gas to the Chemical Ionization Inlet carried by the sample gas flow;

1.3 Analyte in gaseous form: According to an embodiment, with reference to FIG. 1, a sample in liquid form and/or in gaseous form can be introduced to the device in a sample carrier flow 101. The analyte can be introduced as an ambient gas directly through the sample flow 101, port 101*p*, the port being modified in an embodiment variant for online sampling of gaseous flows. In this embodiment, the introduction port (101*p*, FIG. 1, according to an embodiment, being modified for the purposes of online gas and or particle sampling) or the heater (112, FIG. 1, if heating of the sample is not of importance in the particular case) must be turned off or removed from the operation in such case, and the filter membrane (103 FIG. 1) must be removed (but left in case particulate matter of interest), in order to have the sample being directly introduced as a gas to the Chemical Ionization Inlet carried by sample gas flow;

However, according to an embodiment the gaseous phase can be a carrier of particulate matter, to be sampled or rejected, in accordance of the interest to the substance to be studied. Although membrane refers to filtration process as such, a skilled person knowns from the embodiments many ways to separate particle phase from another present phase.

1.4 Inlet of a system embodiment: According to an embodiment, the same inlet and configurations of it can be used as part of a larger system, that can include a preconcentrating unit or device, heated impactor plate, system that separates the sample from coarse particles. The analyte processing can be made according to the embodiments indicated in 1.1, 1.2 and 1.3 in suitable part as applicable. One example is shown in a priority application, indicative of embodiments for luggage scanning.

2. According to an embodiment of the MID-device, as a Chemical Ionization Inlet CII (102, 105, 106, 302, and 107 as exemplified in FIG. 1) part of the MID-device consists of the following blocks and functions as follows:

2.1 The sample gas is carried by sample flow (101, FIG. 1) towards the MS pinhole (107 FIG. 1) at CII port (104 FIG. 1) the regent chemical is introduced to the sample. According to embodiments, the reagent chemicals, depending on application, might include alone or in combination but not limited to: Br—, NO3-, Cl—, I—, 02-, H30+, Li+, NH3+ (also as reagents R1, R2 in the embodiments, in suitable part). For versatile and more universal use Br has been proven to work best in negative mode in such embodiments if the mass resolution of the detector allows for low selectivity. In particular, Br— has been proven to work adequately for the mentioned especially for detection of explosives. For use with Br— in particular, it was found that shorter residence time is preferable to minimize reaction time and the effects of the charge transfer from the bromide adduct. Hence the Ionization Chamber in this embodiment (FIG. 1) has very short residence time, constrained by the size of the ion source (106 FIG. 1).

2.2 According to an embodiment, the sample-reagent mixture then enters the Ionization Chamber, at which stage the Sheath Flow (105 FIG. 1) is introduced. The primary function of the sheath flow is to keep sample flow laminar and minimize wall effects by keeping walls of the Ionization Chamber (IC) and sample gas separated. Consequently sheath air flow also makes sure that the walls keep clean by preventing entry of materials on to the walls. However, in an embodiment, the sheath flow also prevents material to mix to the core flow, where the sample constituents are with reagent species. When sample and sheath flows are matched to form well defined laminar flow, and tuned, the sample flow is situated in the middle of the IC and sheath flow creates a protective sheath of air around it with minimum diffusional mixing between them.

According to an embodiment, also electric fields can be used optionally or in addition to assist the sheath flow, provided that the voltage related current density is kept low, for prevention of turbulence generation to the sheath flow.

Depending on the geometry and application one might apply different flow ratios, for this embodiment example in accordance of the FIG. 1, the sample flow was 2.5 litres per minute (matching the sample flow of to the mass spectrometer (MS) embodied in the example) and sheath flow was 27.5 litres per minute. The sheath flow also makes it possible to match the coaxial sample flow and MS sample flow so that only diffusion is causing sample losses. Furthermore, it minimizes even these losses by shortening the residence time in the ionization region which is geometrically constrained by mechanical design limits. With these geometrical constraints, the sheath flow makes it possible to adjust the ionization and/or reaction time as wanted (in this case of example embodied with Br— to get it short enough for the maximum efficiency).

2.3 According to an embodiment the sample-reagent mixture is then ionized by Soft X-ray (302). The advantage of using soft X-ray in an embodiment is that there is higher chances to keep target molecules intact, it is bipolar and can be used both in positive and negative detection modes, is non-radioactive and generally less hazardous and less constrained in use by regulations than radioactive sources.

However, for other applications variety of ion sources can be used (including but not limited to: corona discharges or other type of electrical dischargers, radioactive sources, UV sources). Ions then travel towards the MS pinhole and enter the detector's interface.

2.4 Several other configurations of the Chemical Ionization Inlet of the MID-device can be utilized that differ from atmospheric operations. In the conventional atmospheric, the reagent is ionized separately and then introduced to a mixing chamber. Differing from the conventional atmospheric, MID-device according to an embodiment, can use two or more Ionization Chambers according to the embodiment, which allows conducting two or more Chemical Reactions simultaneously to occur. Then, even analyte mixtures can be optimized to get sampled to the mass spectrometer analysis.

It is important to notice, that soft X-ray ionization or a "photo ionization" and chemical ionization can happen simultaneously in the embodiments.

Several CI-mechanisms at the same time can be and are facilitated to occur in an embodied inlet in operation, which is not in principle possible (or unwanted) in former atmospheric type design devices where only one selected and well defined ion type is introduced to the sample with electrical field leading to relatively selective and clean spectra.

For the large variety of compounds that has to be detected simultaneously we need larger variety of ionization mechanisms than atmospheric design devices could provide, to be possibly present at the same time. However, the facilitation to a multitude of ion species being under selection for the same abundance of ionization schemes can be in turn beneficially available for atmospheric research, especially if they can be used in a controlled way as in embodied MID-device3, turning on/off separately ion sources and/or reagent feed(s) into reaction chamber and to avoid cross-contamination.

In atmospheric design devices mechanisms of multiple ionization mechanisms are not wanted if the user of the device cannot know how the user affects to the original sample. The embodied MID-devices makes that possible, to have the ionization mechanisms being used in a controlled way, and/or the ionization scheme can be chosen/changed at will.

FIG. 2 illustrates a method of analyzing analyte species in a sample, wherein the method comprises
  bringing the sample (201) to an universal unit to utilize chemical ionization (MID) according to any claims 1 to 11 comprising:
  introducing at least one sample (203) to a sample introduction port, for such sample introduction comprising an analyte to be identified,
  mixing in a chamber (204), comprising at least a mixing chamber part as a first chamber part, for mixing the analyte of the introduced sample with at least one introduced reagent species, or with separately formed reagent ions, according to an embodiment the reagent ions can be introduced to the mixing chamber where they react with the sample analyte and/or sample analyte ions,
  ionizing in a chamber (205), comprising an ionization chamber part, for ionizing at least one reagent species in a charging, as a second chamber part, to ionize the injected at least one reagent species within the presence of the analyte, if the reagent species are not separately ionized to be mixed with the sample analyte and/or sample analyte ions,
  producing reagent originating species ions (206) by a ionization source for ion production in a ionization process ionization products in a ionization chamber part, reagent ions after being accelerated into the mixing chamber to interact with sample analyte,
  exposing sample analyte to ionization products (207) to form adducts in a chamber, a reaction chamber part to facilitate adduct formation of said analyte and said at least one reagent species originating ionization product species to form adducts according to their ion species with analyte molecules,
  producing adducts (208), in the unit further comprising optionally at least an electrode pair, said electrode pair further being arranged for maintenance of at least one electric field therebetween said electrodes of said at least one electrode pair,
  guiding (209) the so formed adducts by an airflow and/or at least said one electric field according to the charge of said adduct to an outlet, of the MID-device from said chamber, as an inlet for an analysis device,
  classifying the adducts (210) in the analysis device as based on the mass to charge ratio for an algorithm to be used in the analysis,
  analyzing the adducts (211) in the analysis device as based on the mass to charge ratio in the analysis of the adduct species by the algorithm.

The method can be performed in suitable part as adapted with an embodied UCUCIunit, in accordance of the embodiments explained in FIGS. 1, 3 and/or 4.

According to an embodiment, the method comprises as an option a phase of inputting at least one reagent species (202) to a reagent inlet, for reagent species introduction. The optional embodiment is indicated by dashed line.

FIG. 3 illustrates an example of a MID-device 300A as embodied as a Dual Ionization Chamber (also as DIC as abbreviated in the following) according to an embodiment of the invention. In DIC, the chemical ionization is implemented simultaneously. The Chemical Ionization inlet CII has in the dual chamber structure essentially two similar chambers CH1 and CH2, for the sample S entry. However, two chamber-structure has been addressed for two different reagents, a first reagent, reagent 1 as R1 and a second reagent, reagent 2 as R2, to be each mixed separately with a portion of the sample, before the entry of the mixtures (S+R1 and S+R2) to the respective chamber of the dual ionization chamber 302 of the unit 300. After the entry to the respective chamber parts, the mixtures are carried in the medium passing the ionization field, in the example embodied by soft X-ray source, being effective via the windows illustrated by the rectangles 302. The soft X-rays are used in the embodiment variant because of the bipolar nature of the charging. According to an embodiment the sampled analyte can be brought to the left hand side of the unit by the flow 301 after preparation as disclosed and embodied in FIG. 1 related embodiments.

According to an embodiment of the FIG. 3 example the MID-device (300A) comprises:
  at least one reagent species inlet, for reagent species injection (exemplified in FIG. 1),
  at least one sample introduction port, for such sample introduction comprising an analyte to be identified (shown in FIG. 1),
  in a chamber of the unit, comprising at least a mixing chamber part (312) as a first chamber part, for mixing the analyte (S) of the injected sample with at least one injected reagent species (R1, R2),
  in a chamber of the unit, comprising an ionization chamber part (302), for ionizing by a ionization unit at least one reagent species (R1, R2) in a bipolar charging obtained, as a second chamber part, to ionize the injected at least one reagent species (R1, R2) in presence of the analyte (S),
  a ionization source for ion production in a bipolar ionization process bipolar ionization products in said ionization chamber part (302),
  in a chamber of the unit, a reaction chamber part (312 to 313) to facilitate adduct (S+R1−, S+R2−) formation of said analyte (S) and said at least one reagent species (R1, R2), by the ionization products (R1−, R2−) to form adducts (S+R1−, S+R2−) according to their ion species (R1−, R2−) with analyte molecules (S),
  the unit further comprising at least an electrode pair (303a, 303b) for maintenance of at least one electric field therebetween said electrodes of said at least one electrode pair,
  the so formed adducts (S+R1−, S+R2−) being guided (304) by at least one electric field (U4) according to the charge of said adduct to an outlet (307), of the universal unit (300) to utilize chemical ionization from said chamber part, as a connection (307) to an inlet for an analysis device.

Although adducts as such are considered as examples above as species in interest to be analyzed, in an embodiment variant it is not only adducts, but also deprotonated species, (like e.g. Target molecule where a proton is removed) and fragments of target molecules and respective adducts with reagent ions for getting can be in the interest, all these species are an achievement of Multi-Method Ionization by the MID-device embodiments.

The chamber has also an electric field maintained by the electrodes 303a for the chamber CH1 and the electrodes 303b for the chamber CH2. The electric fields are respectively produced by the voltages Ua and Ub in the example, in respect to the ground (or another suitable reference) potential. In an example the Ua can be selected to be 300 V and Ub 100 V, without any intention to limit the voltage values only to the shown examples or the value ratio there between. The insulation 310 is used to isolate the chamber walls when in different potential. Within the provision that large current densities as in corona discharge may promote turbulence via hydrodynamic flows, the fields are embodied with electrostatic nature, in such embodiments where used, although the voltages might be alternating in an embodiment variant.

According to an embodiment, the voltages Ua and Ub can be selected on the basis of the ion adduct ($S+R_1^-$ and $S+R_2^-$) mobilities, so that the adducts $S+R_1^-$ can travel and match the path via the orifice between the walls (insulated by isolation 310) of the chamber CH1 and CH2, at the kicker electrode 304 location or near, the kicker electrode provided with a kicker voltage, as exemplified as 1 kV, and through the orifice so that also the adducts $S+R_1^-$ end up to the ion guide 305 at the wall of the chamber CH2, the ions to be further guided to the connection 307 to an MS-inlet, the unit's 300A outlet 307, that is the outlet of the chamber CH2 outlet too, to the ion detector, such as exemplified as mass spectrometer for the analysis. The ion guide 305 can be flushed by the flow 306, that is drawn according to an embodiment opposite direction to the ion path for the adducts S+R1− and S+R2−. The ion guide is there for guiding ions out of the chamber and the MID-device, for their entry to the analyzing device, such as a MS. However, in an embodiment the flow 306 provided with flow means, cited with the same number, can be used also to adjust the through passing ions and/or adducts, as based on the ion mobility and the flow.

The excess flows 309a and 309b are directed out of the respective chambers CH1 and CH2. The chambers CH1 and CH2 are isolated by an isolator material 310. The kicker electrode 304 is also isolated from the CH1 wall. The 309a and 309b are lean as much as possible from the analyte to be analyzed in the MS, that achieved by the settings of the flow, electric fields, radiation dose and/or the radiation window 302 geometry.

The dimensions are illustrative, but the dimension ratios are not restricted only to the exemplified because of the dimensions, but a skilled person in the art can modify the dimensions on the basis of the embodiments, when the mobilities of the adducts on the compositional basis are selected for the set geometry, or vice versa with the geometry and the mobilities.

Sheath flow can be used in suitable part in the embodiments of FIGS. 3 and 4, according to the indications of the embodiments described in the FIG. 1. Then the Flows 301 comprises the sample flow and the reagent flow, as embodied in the middle of each of the chambers as in FIG. 1, and the sheath flow surrounding the core flow as embodied in the FIG. 1 examples.

According to an embodiment of the invention, the DIC structure can be used for considerations of one sample by two chemical ionization chemistries without need to switch the set-up, so producing redundant but diversified results to be used in the identification of the sample analyte S. Consequently it is improving the detection probability of reliable indication of certain analyte S presence in the sample.

Although it might be possible to increase the number of chambers in an MID-device (or -unit) utilizing the structure of the DIC in a multiple way, in the light of the shown embodiments, in such embodiments the sample may be compelled to get divided so many parts as there are chambers, consequently resulting too low sample molecules available to the MS, potentially having the risk of the losses in the device because of diffusion or alike processes to cause losses to walls for example. It is also possible that in such embodiments an extremely analyte-lean sample would suffer from the distributing problems of rarely present molecules for decision what chamber has the optimum signal of the analyte mass to follow. However, if sample is sufficiently rich, such a chamber can be used in suitable circumstances in co-incidence type measurements, for example to suppress the noise from the background.

The FIG. 4 is illustrative of such an embodiment variant of the MID-device 300B to utilize the simultaneous ionization of reagents, but to be made in each reagent flow line branch separately. In an embodiment variant of FIG. 4 the reagents as embodied in the example are $NO_3^-$ and Br, but the selection is not limited only to the shown examples.

The item 403 is illustrative of an accelerator part 403 to accelerate the reagent ions formed in the reagent flow branch through the accelerator 403. The lines 411 are illustrating accelerator rings to be used in both branches, the detailed rings illustrated in FIG. 4b. Although just only one ring 411 is marked with the reference number in FIG. 4, the same way drawn rings are also intended to be considered as accelerator rings, for accelerating the formed ions by the X-rays by the source being at least partly surrounding the accelerator 403 structure with the rings 411. The double sided arrow in FIG. 4b is indicative of the schematic perspective of the same accelerator 403 from different view of illustration. X-rays are illustrated by the reference numeral 302 used for radiation window, is indicative also for the soft X-ray source to be used in the irradiating the reagents to form ions. However, a skilled person knows from the shown embodiments that other ion sources might be utilized depending on application.

The FIG. 4 embodiment is illustrating up to two reagent ion species to be utilized in the analyte-ion adduct formation, as embodied to be combined after the reagent ionization. However, skilled person in the art realizes from the embodiment indicated, that the FIG. 4 embodiment does not need so many chambers into which the analyte of the sample would be divided. Consequently, even more reagent branches could be embodied for use of even more rich analyte species analysis via additional reagent branches than the mere two that were illustrated in the example of FIG. 4. However, the mechanical dimensions may limit the number via the path of the adducts and/or ions, as well as multipole formation of the electric fields present in the multi-branch embodiments, in such embodiments that use electric field to guide the adducts. According to an embodiment also sheath air flow can be used, as an alternative or supplement to the electric fields in suitable part. According to an embodiment the electric fields can be formed by a plurality of electrodes, so that for example the electric field can be formed by a tripole, quardupole, hexapole or octopole.

In FIG. 4 the Ea is indicative of an electric field to be used with the ion species $NO_3$ acceleration at the location of the accelerator 403. In FIG. 4 the Eb is indicative of an electric field to be used with the ion species Br acceleration at the location of the accelerator 403. NO3 and Br are examples of such reagents as the respective R1 and R2.

The accelerator comprises in the casing 402 an X-ray source, or X-ray optics, to direct and divide the X-rays into the radiation geometry with suitable distribution of the dose at a local part of the accelerator. The reference 302 is indicative of the X-ray-window, but also those parts that allow the X-rays to enter to the accelerator volume at the middle of the accelerator rings 411.

The Flush is indicative in FIG. 4 for a flushing flow to prevent the ions to attach to the entry part of the chamber CH1. According to an embodiment, prime idea to use the flush is to have a flush flow in preventing neutral reagent species and other impurities to enter the reaction chamber, as only ions are accelerated in the embodiment variant. However, according to an embodiment the flush flow can have also a function that allows to switch off the feed at will, by switching off the ion source and or accelerators, so to influence to the ion species selection available for a certain operation.

The reference 302b in FIG. 4 is indicative of an additional option to irradiate the reagent-sample combination even more, if desired according to such an embodiment variant. The optionality has been indicated with a dashed line. Although only one radiation window at the electric field Ea is indicated, at the electric field Eb at the right, indicative of a reagent flow branch using Br for ion formation at the outlet 311 location or near, can be provided also with an additional option to further irradiate the sample with the reagent at the branch, although not drawn to the FIG. 4, only to keep the Fig simpler.

With a set flow and flow geometry, the reagent flow entry position in the embodiments indicated via FIG. 4 can be selected in respect to the criterion of the intended reagent ion mobility and/or reaction time to form an adduct with an analyte molecule. In case of several analyte molecules present in the sample, the position is selected in respect to the primary target molecule of the reagent molecule to form adducts with it.

Although primary target molecules to have the reagent molecule to form adducts with such were the main target in one embodiment variant ensemble, a skilled person in the art knows from the embodiments that it is also possible to look at other ionized species and make this according to their life-time etc., by using embodied MID-devices.

As a generalization, similar structure with electric field and additional option to irradiate could be possible to embody also for MID-units with such DIC that have even more reagent flow branches than the exemplified two.

FIG. 5 is illustrative of an embodied MID-unit test results. A proof-of-concept prototype of an embodied DIC was constructed and tested. Iodoethane (IE) reagent was mixed to the flow in chamber 1 (CH1, FIG. 3). The test results show unambiguously that the primary I— ions transfer through the hole and in to the MS only when the guiding voltages are on. A source of RDX was added to the flows going to chamber 1 and chamber 2 (CH1, CH2 FIG. 3). alternatively. The results in FIG. 5 show a definite [RDX+I]-adduct present when RDX was added to the chamber 1. Much smaller amount of the [RDX+I]— adduct was detected when RDX was added to the chamber 2. This is due to the I— ions making an adduct in while crossing the chamber 2, and can be diminished by adding an ion guide flush flow, which was not featured in the prototype test. The two competing chemistries in this experiment were nitrate ion ($NO_3^-$) and iodine ion (I—) chemistries. Nitrate, being ubiquitous, was present in the room air used as a sample flow. FIG. 2 also show the $[RDX+NO_3]^-$ adduct, when the RDX was added into the chambers.

FIG. 6 is illustrating a system 600 according to an embodiment of the invention. The system is illustrative in a schematic way such embodiments that can comprise at the beginning of the sampling line a detachment unit 601, which is arranged to detach samples from surfaces for example, by pressurized air pulses as indicated in a priority application of the present application. The detachment unit 601 can comprise also conduits to the air supply, as well as the sample feeding ports to provide the sample to the further stages in the system, conveyer belts where applicable and the casing with the related respectively tuned doors and traps for the luggage, cargo and/or passengers. However, as the detachment unit 601 can be an optional accessory for the system embodiment variants, it has being drawn in the FIG. 6 by a dashed line.

The system 600 can comprise in an embodiment of the invention variant a pre-concentration unit 602 that can be used to concentrate the sampled substances before the entry to the chemical ionization utilizing MID-unit according to an embodiment. The pre-concentration unit can be implemented at least partly by a virtual impactor as indicated in a priority application of the present application. According to an embodiment variant the pre-concentration unit can comprise further virtual impactor stages in addition to the first stage in the item 602 that reduce the sample flow by means of impactors from high volume levels of several cubic meters per seconds scale to few tens of liters per minute, simultaneously concentrating the detached material by the unit 601 for example to the tens of liters per minute flow at the corresponding impactor stage output.

The unit 602 can comprise also an impactor stages, especially in such embodiments, if the MID-unit 100, 300A, 300B does not itself contain in an embodiment needed thermally heated impactor plate comprising impactor, for desorption or evaporation of sample contained potential ELVOCs, or, illicit substances under the interest in the samples taken from the luggage, cargo and/or passengers.

The system elements 100 and 300 as embodied as MID-units in suitable part in the present application prepare the sample contained analytes in the chemical ionization chambers to form adducts from the analyte and reagent species, to be fed to the mass spectrometer (MS) 603 for the analyte identification as based on mass to charge ratio by the adduct mobility. The identification can be made in a computer that is used in the MS control, to control the process of the system and/or to run the algorithm for the cluster analysis to identify the adducts as based on their mobility.

According to an embodiment, the illicit substances in the interest comprise drugs, explosives, super toxics and/or nerve gases, or combinations thereof. According to an embodiment, the reagents to be used in a MID-unit in an embodiment (or a plurality of such in an embodiment variant), are selected according to the illicit substance specific way for the lowest detectable concentration.

The scope of the invention is determined by the attached claims together with the equivalents thereof. The skilled persons will again appreciate the fact that the explicitly disclosed embodiments were constructed for illustrative purposes only, and the scope will cover further embodiments, embodiment combinations and equivalents that better suit each particular use case of the invention.

The invention claimed is:

1. A Dual MID-device (300A), wherein the Dual MID-device (300A) comprises at least two chambers (CH1), (CH2), a first chamber (CH1) and a second chamber (CH2), said chambers each being dedicated to a respective reagent species (R1), (R2), respectively, to have the sample (S) being exposed with, (101), as being divided by a divider (312b) into said chambers (CH1), (CH2), to a first sample part and a second sample part, each sample part with sample part specific sample analytes (R1), (R2) for getting mixed into chamber specific flows (301) in the chamber entry part of the port structure (312) with said reagents (R1), (R2), respectively, to expose each chamber specific sample-analyte reagent mixtures (S+R1), (S+R2) to ionization simultaneously, the reagent and sample analyte part together carrying the sample analyte and a reagent species to pass by the ionization source (302) that is arranged to ionize the sample analyte simultaneously together with the reagent species in each chamber (CH1), (CH2).

2. The Dual MID-device (300A) according to claim 1, wherein each chamber (CH1), (CH2) comprise a chamber specific sheath potential sources (Ua, Ub), arranged to the respective chambers (CH1), (CH2) to set the chamber walls (303a), (303b) to the respective chamber specific sheath potential (Ua), (Ub).

3. The Dual MID-device (300A) according to claim 1, wherein the ion source comprises an X-ray source, advantageously separated from the chamber (CH1), CH(2) by a window (302) allowing the X-rays to penetrate into the chamber (CH1), CH(2) at the window location in the chamber (CH1), CH2.

4. The Dual MID-device (300A) according to claim 1, wherein each chamber (CH1), (CH2) comprises a chamber part, as a reaction chamber, after the ionization part end (313) to provide reaction time to formation of adducts from the chamber specific reagent species (R1), (R2) and the sample (S) part analytes pre sent in the chamber (CH1) (CH2) to form reagent specific adducts (S+R1−), (S+R2−) in each reagent specific respective chamber (CH1), (CH2).

5. The Dual MID-device (300A) according to claim 1, wherein each chamber comprises a port structure (312) further comprising at least one of the following ports: a reagent introduction port (104), sample introduction port (101, 101p), sheath flow introduction port (105), a flow laminarization assembly (FLA) arranged to be located at the sample entry part (312) of the chambers (CH1), (CH2) to make the sample flow (301) laminar in the chambers (CH1), (CH2) at each chamber (CH1), (CH2) entry.

6. The Dual MID-device (300A) of claim 1, wherein the Dual MID-device (300A) comprises a passage between at least two chambers (CH1), (CH2), for providing a passage to reagent specific adducts (S+R1−) to exit (311) of the Dual MID-device (300A) from a chamber (CH1), (CH2) of the dual MID-device (300A).

7. The Dual MID-device (300A) of claim 1, wherein the exit (311) part of the Dual MID-device (300A) comprises an ion guide assembly (304, 310, 305, 306, 307) to guide the adducts out of the Dual MID-device (300A) by at least one of the following: by electric field (305), by a kicker electrode (304,310), by flow means (306) to provide a flow to flush, or for a counter flow (306), and a connection (307) to the ion analyzer.

8. The MID-device (300B) of claim 1, wherein the exit (311) part of the MID-device (300B) comprises an ion guide assembly (305, 306, 307) to guide the adducts out of the MID-device (300B) by at least one of the following: by electric field (305), by a kicker electrode, by flow means (306) to provide a flow to flush or a counter flow (306), a connection (307) to the ion detection device.

9. The MID-device, according to claim 1, wherein the ionization source (106, 302) comprises comprises at least one of the following: corona discharger, UV-source, radioactive source, at least one of the said individually or in combination, an X-ray source of soft X-rays, the energy of the X-rays being below 9 keV, advantageously below 7 keV, more advantageously be low 6 keV, and simultaneously, preferably over 1 keV, but more preferably over 3 keV, or, the energy being selected from such a range that is comprising a below definition for the energy from the said below values and an over definition for the energy from the said over values.

10. The MID-device, according to a claim 1, comprising such a chamber (CH1), (CH2) that comprises at least two of the following: a mixing chamber part, an ionization chamber part, a reaction chamber part, in a same chamber, the other said parts being in operative communication, but separated.

11. A MID-device according to claim 1, comprising at the be-ginning end of the mixing chamber part, or connected thereto, a desorption unit for evaporating analyte from a collected sample.

12. A system to identify an analyte species from a sample, comprising in the system (600) as system elements an ion detection device, such as a mass spectrometer, advantageously such as an API-TOF-mass spectrometer (603), a pre-concentration unit (602) and/or a detachment unit (601), before a MID-device (100), (300A), (300B), for concentrating the sample for the analysis, wherein said pre-concentration unit (602) comprises a concentrator that is selectable from the following: an acoustic concentrator, aerodynamic lens, cyclone, or combination of the just mentioned, and the system comprises also
at least one MID-device (100, 300A, 300B) to utilize at least chemical ionization according to claim 1.

13. The system of claim 12, wherein the system (600) further comprises as a system element such a pre-concentration unit (602) that comprises a virtual impactor unit further comprising at least one virtual impactor stage adapted to a high volume sampling with a high volume sampling flow.

14. The system of claim 13, wherein the system (600) further comprises in the virtual impactor unit a second virtual impactor stage adapted to suppress the high vol-ume sampling flow to the MID-device (100, 300A, 300B), and/or a desorption stage to vaporize an analyte for the entry to the MID-device (100, 300A, 300B).

15. A MID-device (300B), wherein the MID-device (300B) comprises a plurality of rea gent flow introduction ports for each reagent (R1, R2), said introduction ports followed by an accelerator (403) provided with a ionization source (302) arranged to ionize each reagent species (R1), (R2) into ions (R1−), (R2−) to be accelerated by electromagnetic fields (Ea), (Eb) before the reagent ion species (R1−), (R2−) entry to the reaction chamber (CH1), wherein the analytes in the sample introduction flow (301) to carry sample analytes to the reaction chamber (CH1) is/are arranged to mix with a at least one of the reagent ion species (R1−), (R2−), at the respective accelerator (403) outlet location to form adducts into the chamber volume (CH1), of the analyte species and the reagent ion species present in the chamber.

16. The MID-device (300B) according to claim 15, wherein the MID device comprises such an accelerator (403)

that comprises flow means (306) arranged to flush the accelerator exit, and/or to adjust the ion species introduction to the chamber part (CH1).

17. The MID-device (300B) according to claim 15, wherein the MID device comprises an additional ion source (302b) in the chamber (CH1) at least at one accel erator (403) location for further ionization of the substances comprising present sample analytes, at the ion source location (302b).

18. The MID-device (300B) of claim 15, wherein the MID device (300B) comprises an exit (311) of the MID-device (300B) from a chamber (CH1), for the formed adducts (S+R1−), (S+R2−), to (307) an ion detection device.

19. A MID-device (100), wherein the MID-device (100) comprises a port structure (312) further comprising at least one of the following ports: a reagent introduction port (104), sample introduction port (101, 101p), sheath flow introduction port (105), a flow laminarization assembly (FLA) arranged to be located at the sample entry part of the chamber (CH1) to make at least one of the sheath flow (105) and sample flow (101) laminar in the chamber (CH1), wherein the MID-device further comprises a ionization source (106) to ionize sample analytes and reagent species in the chamber part (102) of the chamber (CH1), wherein the sample flow channel (101) extending to the chamber (CH1) is arranged to guide the sample analytes in the core flow in the chamber (CH1) core part together with the reagent species, the core flow being surrounded by the sheath flow, the core flow carrying the sample analytes and a reagent species to pass by the ionization source (106) that is arranged to ionize the sample analyte molecules simultaneously together with the reagent species.

20. A method of analyzing analyte species in a sample, wherein the method comprises bringing the sample (201) to a MID-device (100, 300A, 300B) according to claim 1 comprising:

inputting (202) at least one reagent species (R1, R2) to a reagent inlet (312, for reagent species introduction, inputting (203) at least one sample to a sample introduction port (312), for such sample (S) introduction comprising an analyte to be identified, mixing (204) in a chamber (CH1), (CH2), comprising at least a mixing chamber part as a first chamber part, for mixing the analyte of the introduced sample with at least one introduced reagent species (R1), (R2), said reagent species being in neutral form (R1), (R2) or in ionized form (R1−), (R2−), ionizing (205) by a ionization source (106, 302, 403), for ionizing at least one re agent species (R1), (R2), producing (206) reagent originating species ions (R1−), (R2−) by a ionization source for ion production in a ionization process ionization products, exposing (207) an analyte to ionization products to form adducts (S+R1−), (S+R2−) in a chamber (CH1), (CH2), in the reaction chamber part to facilitate adduct formation of said analyte and said at least one reagent species originating ionization product species to form adducts (S+R1−), (S+R2−) according to their ion species with the analyte molecules, producing (208) adducts (S+R1−), (S+R2−), in the MID-device (100, 300A,300B), guiding (209) the so formed adducts (S+R1−), (S+R2−) by at least one of the following: electric field and sheath flow to the exit (107, 107b, 307, 311) of the MID-device as an inlet for an ion detection device, classifying (210) the adducts in an ion detection device as based on the mass to charge ratio for the mass analysis, analyzing (211) the adducts in the ion detection device as based on the mass to charge ratio.

* * * * *